US006320653B1

(12) United States Patent
Feist

(10) Patent No.: US 6,320,653 B1
(45) Date of Patent: Nov. 20, 2001

(54) MULTIPLE-AXIS INCLINOMETER FOR MEASURING INCLINATIONS AND CHANGES IN INCLINATION

(75) Inventor: Wieland Feist, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/432,316

(22) Filed: Nov. 2, 1999

(30) Foreign Application Priority Data

Nov. 2, 1998 (DE) .............................. 198 50 485

(51) Int. Cl.$^7$ .............................. G01B 11/26; G01C 9/06
(52) U.S. Cl. .................... 356/139.1; 33/366.12; 33/366.16; 33/366.23
(58) Field of Search ...................... 356/139.1; 33/366.12, 33/366.16, 366.23

(56) References Cited

U.S. PATENT DOCUMENTS

| 4,666,299 | * | 5/1987 | Tamaki et al. |
| 5,371,951 | * | 12/1994 | Piske |
| 5,392,112 | * | 2/1995 | Nakamura ............... 356/139.1 |
| 5,510,892 | * | 4/1996 | Mizutani et al. ......... 356/139.1 |
| 5,729,337 | * | 3/1998 | Tanaka .................. 356/139.1 |

FOREIGN PATENT DOCUMENTS

| 677403 | 5/1991 | (CH) . |
| 41 10 858 | 4/1991 | (DE) . |
| 196 10 941 | 9/1997 | (DE) . |
| 198 19 610 | 8/1999 | (DE) . |

OTHER PUBLICATIONS

English Abstract of CH 677,403.
English Abstract of DE 198 19 610.
English Abstract of DE 196 10 941.
English Abstract of DE 41 10 858.

* cited by examiner

Primary Examiner—Stephen C. Buczinski
(74) Attorney, Agent, or Firm—Reed Smith LLP

(57) ABSTRACT

A multiple-axis inclinometer for measuring inclinations and changes in inclination comprises a cell which contains a liquid forming a horizon and which has a transparent base, and a device for illuminating a cross-line plate and imaging optics in the form of a piano-convex lens, which is arranged at the base of the cell or is a component part of the base, for imaging the cross-line plate on a receiver arrangement in the form of a CCD line. Two cross-line plates are provided, each having a cross-line grid formed of parallel cross-lines, wherein a light source is associated with each cross-line plate and illuminates the cross-line plate associated therewith. These two cross-line plates lie one above the other in an imaging plane which extends perpendicular to the surface of the liquid and in which the CCD line is also arranged, wherein the cross-lines of the two cross-line plates enclose an angle relative to one another whose bisector extends perpendicular to the imaging plane. The imaging of the two cross-line grids located at a distance from one another is carried out on the CCD line by means of total reflection at the horizon of the liquid and through the plano-convex lens.

8 Claims, 1 Drawing Sheet

MULTIPLE-AXIS INCLINOMETER FOR MEASURING INCLINATIONS AND CHANGES IN INCLINATION

BACKGROUND OF THE INVENTION a) Field of the Invention

The invention is directed to a multiple-axis inclinometer for measuring inclinations and changes in inclination, especially for precision measurements with geodetic devices.

b) Description of the Related Art

Devices with a cuvette or cell with a liquid forming a horizon are used for precise measurements of inclination. A projected light bundle is reflected at this liquid horizon.

Conventional biaxial inclinometers have a prism with a cell and separate optics which serve to image a pattern of cross-lines on a CCD line via a liquid horizon on the transmitter side or via a surface sensor on the receiver side. An imaging system and a measurement system which are arranged perpendicular to one another are provided for each direction of inclination. In this respect, it is difficult to accommodate the four optical systems of the crossed imaging systems in a very compact space.

These difficulties are overcome by a biaxial inclinometer according to DE 198 19 6510 which is constructed in a very simple manner. A thick plano-convex lens at the base of a liquid cell takes over the function of illumination optics as well as imaging optics for cross-line patterns which are imaged on a CCD line. Corresponding measurement values are determined for the inclinations by displacing the images of the cross-line patterns on the CCD lines.

DE 41 10 858 describes a biaxial inclinometer which has an imaging system and a cross-line pattern which has cross-lines arranged at right angles to one another and is illuminated by a light source in the transmitter plane. This cross-line figure has at least one angle whose imaged side intersects a CCD line at two points. Measurement values for determining the transverse and longitudinal inclination of the device can be derived from the change in distance or from the simultaneous common displacement of these two points occurring when the device is inclined and corresponding inclination values are determined from these measurement values. This inclinometer does not need intersecting illumination and imaging systems for the cross-line pattern. However, it is disadvantageous that only inclinations in a small angular range can be measured. Also, the arrangement of illumination optics and imaging optics has a negative effect on the size of the inclinometer in that there can be no reduction below certain boundary magnitudes.

OBJECT AND SUMMARY OF THE INVENTION

It is the primary object of the invention to provide a multiple-axis inclinometer having compact dimensions, enabling highly precise measurements of inclination and requiring fewer components.

This object is met according to the invention in a multiple-axis inclinometer for measuring inclinations and changes in inclination comprises a cell which contains a liquid forming a horizon and which has a transparent base, and a device for illuminating a cross-line plate and imaging optics in the form of a plano-convex lens, which is arranged at the base of the cell or is a component part of the base, for imaging the cross-line plate on a receiver arrangement in the form of a CCD line. Two cross-line plates are provided, each having a cross-line grid formed of parallel cross-lines, wherein a light source is associated with each cross-line plate and illuminates the cross-line plate associated therewith. These two cross-line plates lie one above the other in an imaging plane which extends perpendicular to the surface of the liquid and in which the CCD line is also arranged, wherein the cross-lines of the two cross-line plates enclose an angle relative to one another whose bisector extends perpendicular to the imaging plane. The imaging of the two cross-line grids located at a distance from one another is carried out on the CCD line by means of total reflection at the horizon of the liquid and through the plano-convex lens.

Accordingly, the cell, the imaging optics and the CCD line are rigidly connected with one another to form a unit. The cross-lines of each graticule or cross-line plate run parallel to one another and are equidistant or at different distances from one another. The cross-line thicknesses can be identical or different.

An advantageous arrangement of the two cross-line plates relative to one another is given when the cross-lines of both cross-line plates form an angle of 90° and the cross-lines of every cross-line plate itself form an angle of 45° with the imaging plane.

Further, it can be advantageous when the two cross-line plates are combined to form one plate, wherein the two cross-line grids of the arrangement shown herein lie in different cross-line fields located at a distance from one another and these cross-line fields are illuminated separately or jointly in a corresponding manner by one light source for each or by a common light source.

The multiple-axis inclinometer according to the invention for the measurement of inclinations and changes in inclination is characterized by a high sensitivity and a large measurement range, so that highly precise measurements can be carried out with it. Due to the simplicity of the construction, it is possible to make do with a few simple components for the construction.

The invention will be described more fully in the following with reference to an embodiment example.

DESCRIPTION OF THE PREFERRED EMBODIMENTS

Figure 1:
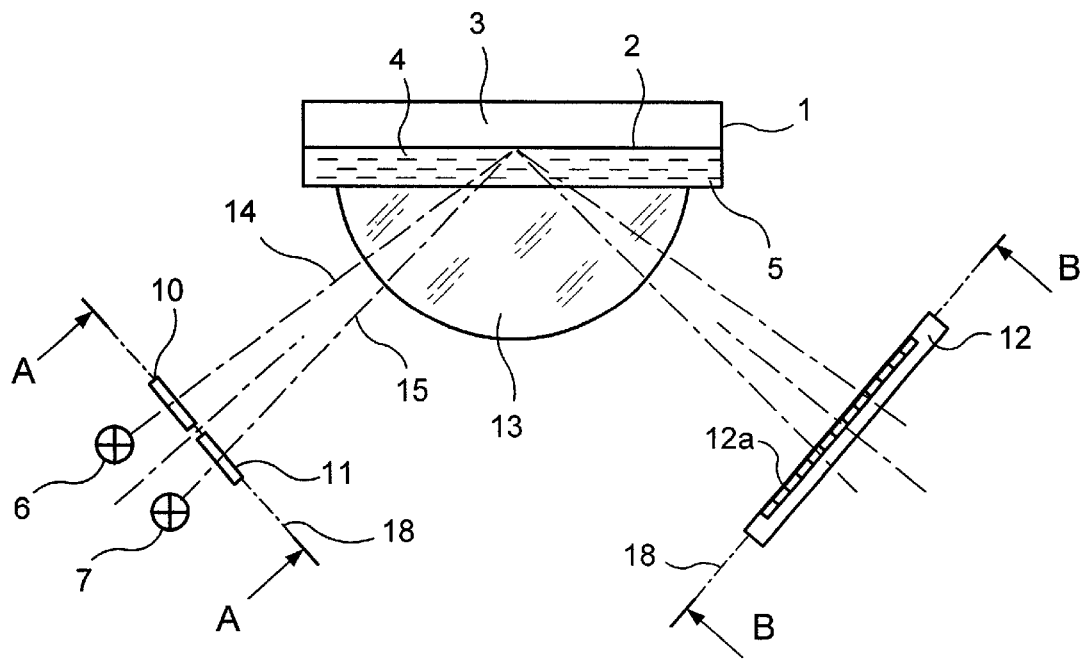
FIG. 1 is a simplified view showing a cross section through the inclinometer according to the invention and a view of the cross-line plates and the CCD line.

The inclinometer according to the invention which is shown in a simplified view in FIG. 1 comprises, as housing, a cell 1 containing a liquid 4 which forms a horizon 2 against a gas space or air space 3. Two light sources 6 and 7 and cross-line plates 10 and 11 having illuminated cross-lines 8 and 9 are preferably provided on the side facing the transparent base 5 of the cell 1, wherein the light sources 6 and 7 as well as the cross-line plate plates 10 and 11 are fixedly connected with the cell 1. One cross-line plate 10; 11 is accordingly associated with each of the two light sources 6 and 7. The illumination of the separate cross-line plates 10 and 11 can also be carried out, in principle, by only one correspondingly constructed light source.

Also provided on the same side in relation to the cell 1 is a receiver arrangement 12 in the form of a CCD line 12a on which the two cross-line plates 10 and 11 are imaged separately from one another after reflection of the two beam paths 14 and 15 at the horizon 2 by imaging optics which are arranged at the base 5 of the cell 1 and constructed as a piano-convex lens 13.

Each of the two cross-line plates 10 and 11 is provided with a cross-line grid 16; 17 formed of parallel cross-lines 8; 9 and they are arranged one above the other vertical to an imaging plane 18 which extends vertical to the surface 2 of the liquid 4, the CCD line 12a also being arranged vertical to the imaging plane 18. The cross-lines 16 and 17 of the cross-line plates 10 and 11 themselves enclose an angle whose bisector extends perpendicular to the imaging plane 18. The cross-lines 8 and 9 of the cross-line plates 10 and 11 together enclose an angle of 90° and form an angle of 45° with the imaging plane 18. The cross-lines 8; 9 of each cross-line plate 10; 11 run parallel to one another and equidistant from one another. However, the cross-lines 8; 9 can also lie at different distances from one another and can also vary in thickness.

The cell 1, the piano-convex lens 13 serving as imaging optics, and the receiver arrangement 12 with the CCD line 12a are rigidly connected with one another.

Figure 1A:
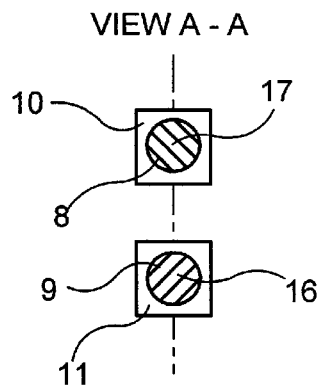
FIG. 1a illustrates a view A—A according to FIG. 1.

FIG. 1a shows two separate cross-line plates 10 and 11 with parallel cross-lines 8 and 9 of the cross-line grids 16 and 17 in view A—A.

Figure 2:
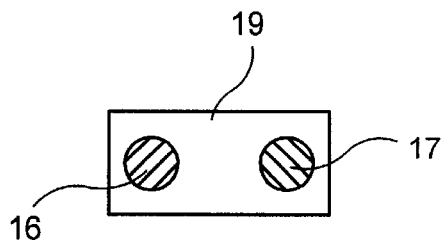
FIG. 2 shows a plate composed of two cross-line plates.

FIG. 2 shows a joint cross-line plate 19 with cross-line grids 16 and 17 with parallel cross-lines 8 and 9.

Figure 3:
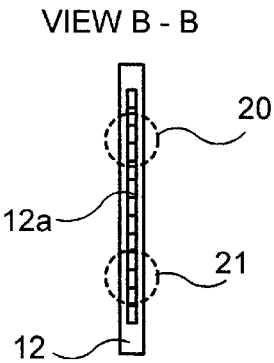
FIG. 3 is a view B—B according to FIG. 1.

FIG. 3 shows the receiver arrangement 12 with the CCD line 12a in view B—B. The position of the images of the cross-line grids 16 and 17 is designated by 20 and 21. This imaging of the cross-line grids 16 and 17 through the plano-convex lens 13 and, after total reflection of the two beam paths 14 and 15 at the horizon 2 of the liquid 4, on the receiver arrangement 12, is preferably effected in such a way that the images 20 and 21 have approximately the same distance from one another as the cross-line grids 16 and 17.

When using the inclinometer according to the invention, e.g., for determining inclinations of geodetic devices or of sighting beams, the distances between the images 2 and 21 on the CCD line 12a change with the inclination of the device in the imaging plane 18, and inclination-dependent signals running in the same direction are accordingly obtained and can be further processed in an appropriate manner. When the device is inclined, e.g., vertical to the imaging plane 18, signals which are proportional to the respective inclination are likewise generated by displacement of the images of the cross-lines 8, 9 of the cross-line grids 16 and 17, which cross-lines 8, 9 form an angle with the CCD line 12a. The adjusted inclinations are determined by corresponding processing of the signals which are obtained in this way.

While the foregoing description and drawings represent the preferred embodiments of the present invention, it will be obvious to those skilled in the art that various changes and modifications may be made therein without departing from the true spirit and scope of the present invention.

What is claimed is:

1. A multiple-axis inclinometer for measuring inclinations and changes in inclination, comprising:

a cell which contains a liquid forming a horizon and which has a transparent base;

a device for illuminating a cross-line plate;

imaging optics in the form of a plano-convex lens, which is arranged at the base of the cell or is a component part of the base, for imaging the cross-line plate on a receiver arrangement in the form of a CCD line;

two cross-line plates being provided, each having a cross-line grid formed of parallel cross-lines;

a light source being associated with each cross-line plate and illuminating the cross-line plate associated therewith;

said two cross-line plates lying one above the other in an imaging plane which extends perpendicular to the surface of the liquid and in which the CCD line is also arranged;

said cross-lines of the two cross-line plates enclosing an angle relative to one another whose bisector extends perpendicular to the imaging plane; and imaging of the two cross-line grids located at a distance from one another being carried out on the CCD line by total reflection at the horizon of the liquid and through said plano-convex lens.

2. The inclinometer according to claim 1, wherein the cell, the imaging optics and the CCD line are rigidly connected with one another.

3. The inclinometer according to claim 1, wherein the cross-lines of each cross-line plate run parallel to one another and are equidistant from one another.

4. The inclinometer according to claim 1, wherein the cross-lines of each cross-line plate run parallel to one another and are at different distances from one another.

5. The inclinometer according to claim 1, wherein the cross-line thicknesses are identical.

6. The inclinometer according to claim 1, wherein the cross-line thicknesses are different.

7. The inclinometer according to claim 1, wherein the cross-lines of both cross-line plates enclose an angle of 90° and the cross-lines form an angle of 45° with the imaging plane.

8. The inclinometer according to claim 1, wherein the two cross-line plates are combined to form one plate, and wherein the two cross-line grids lie in different cross-line fields located at a distance from one another.

* * * * *